(12) United States Patent
Matsui et al.

(10) Patent No.: US 7,778,134 B2
(45) Date of Patent: Aug. 17, 2010

(54) WAVEFORM EQUALIZATION CONTROL DEVICE

(75) Inventors: Seiji Matsui, Osaka (JP); Youichi Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 11/917,253

(22) PCT Filed: Jul. 20, 2006

(86) PCT No.: PCT/JP2006/314406

§ 371 (c)(1),
(2), (4) Date: Dec. 12, 2007

(87) PCT Pub. No.: WO2007/010993

PCT Pub. Date: Jan. 25, 2007

(65) Prior Publication Data

US 2009/0103413 A1    Apr. 23, 2009

(30) Foreign Application Priority Data

Jul. 20, 2005    (JP)    ............... 2005-209749

(51) Int. Cl.
*G11B 7/00* (2006.01)
(52) U.S. Cl. ................. 369/59.22; 369/47.19
(58) Field of Classification Search .............. 369/59.22, 369/53.16, 124.07, 124.04, 59.23, 47.1, 47.19, 369/47.26, 47.14, 47.18
See application file for complete search history.

(56) References Cited

U.S. PATENT DOCUMENTS

| 6,052,349 | A  | * | 4/2000  | Okamoto ............. 369/47.26 |
| 6,385,239 | B1 |   | 5/2002  | Okamoto et al. |
| 6,836,511 | B1 |   | 12/2004 | Marukawa |
| 7,151,642 | B2 |   | 12/2006 | Ohkubo et al. |
| 7,171,608 | B2 |   | 1/2007  | Aida et al. |

(Continued)

FOREIGN PATENT DOCUMENTS

CN    1495772 A    5/2004

(Continued)

OTHER PUBLICATIONS

Chinese Office Action, w/ English translation thereof, issued in Chinese Patent Application No. CN 200680021484.1 dated Dec. 4, 2009.

*Primary Examiner*—Nabil Z Hindi
(74) *Attorney, Agent, or Firm*—McDermott Will & Emery LLP

(57) ABSTRACT

A waveform equalization control device includes a waveform equalizer that has a filter provided with a plurality of taps, updates the tap coefficient of each of the plurality of taps in accordance with a tap coefficient signal inputted thereto, causes the plurality of taps to respectively receive a plurality of values sampled at different time points from an input signal, performs waveform equalization with respect to the input signal, and outputs the signal after the waveform equalization, an equalization target value generation unit for determining an equalization target value, an error estimation unit for obtaining the error between the equalization target value and the signal after the waveform equalization, and a coefficient update unit for determining an amount of updating the coefficient of each of the taps of the filter of the waveform equalizer based on the error signal and on the input value to each of the taps and outputting the amount of updating the tap coefficient as the tap coefficient signal. The equalization target value generation unit obtains sign signals each showing whether the signal after the waveform equalization has a positive value or a negative value for first to fifth time points and determines a value corresponding to a total sum which is a sum of respective results of multiplying the sign signals for the first to fifth time points by $\theta$, $\beta$, $\alpha$, $\beta$, and $\theta$ (where each of $\alpha$, $\beta$, and $\theta$ is a predetermined real number) as the equalization target value.

6 Claims, 14 Drawing Sheets

U.S. PATENT DOCUMENTS

| | | |
|---|---|---|
| 2002/0009035 A1 | 1/2002 | Tonami |
| 2003/0002418 A1 | 1/2003 | Mouri et al. |
| 2004/0076245 A1 | 4/2004 | Okamoto et al. |

FOREIGN PATENT DOCUMENTS

| | | |
|---|---|---|
| CN | 1637915 A | 7/2005 |
| JP | 2000-123487 | 4/2000 |
| JP | 2000-222824 | 8/2000 |
| JP | 2002-032967 | 1/2002 |
| JP | 2003-016733 | 1/2003 |
| JP | 2003-085764 | 3/2003 |
| JP | 2004-139664 | 5/2004 |

* cited by examiner

FIG. 2
(a)
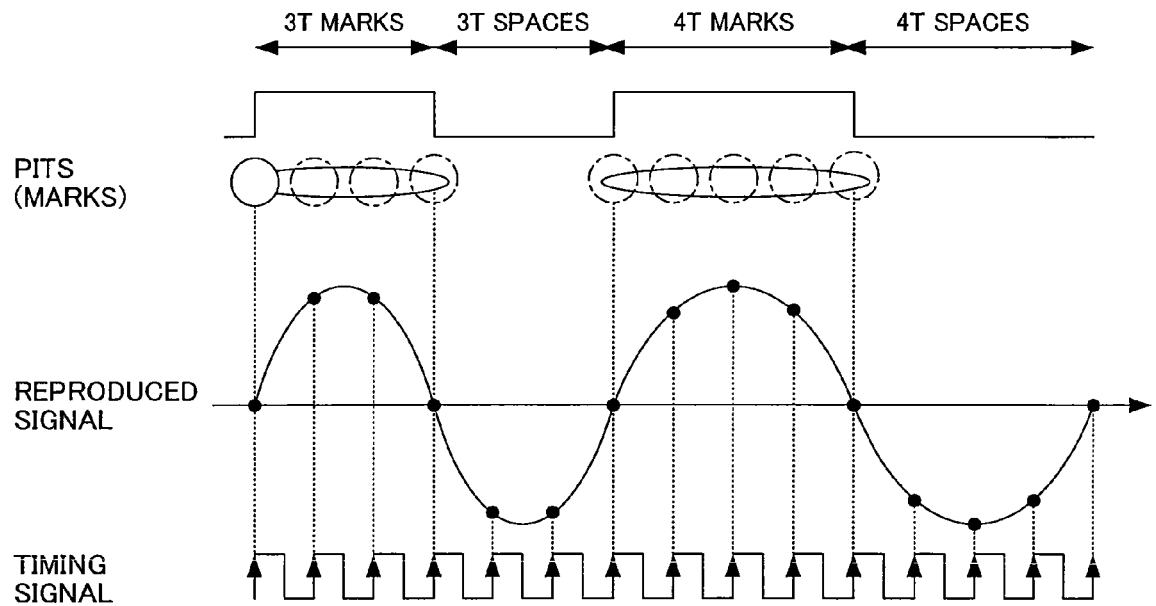
(b)
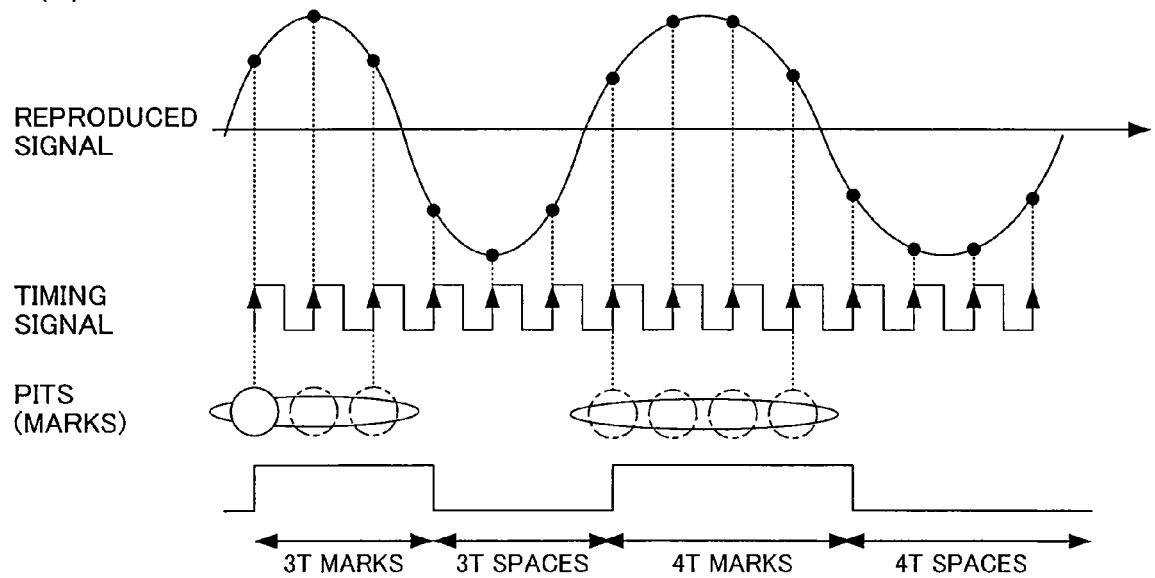

|  | LIMIT PLACED BY (2, 10) RLL CODE |
|---|---|
| 00000 | 00000 |
| 00001 | 00001 |
| ~~00010~~ | 00011 |
| 00011 | 00111 |
| ~~00100~~ | 01000 |
| ~~00101~~ | 01100 |
| ⋮ → | 01110 |
|  | 01111 |
| ~~11010~~ | 10000 |
| ~~11011~~ | 10001 |
| 11100 | 11000 |
| ~~11101~~ | 11100 |
| 11110 | 11110 |
| 11111 | 11111 |

(b)

| STATE $S_i(C_{k-4}, C_{k-3}, C_{k-2}, C_{k-1})$ | CURRENT STATE $S_j$ | | | | ESTIMATED VALUE OF DECODER $X_k$ | |
|---|---|---|---|---|---|---|
| S0( 0, 0, 0, 0 ) | S0 | S1 | 0 | a | | |
| S1( 0, 0, 0, 1 ) | – | S2 | – | a+b | | |
| S2( 0, 0, 1, 1 ) | – | S3 | – | a+b+c | | |
| S3( 0, 1, 1, 1 ) | S6 | S7 | 2b+c | a+2b+c | | |
| S4( 1, 0, 0, 0 ) | S0 | S1 | a | 2a | | |
| S5( 1, 1, 0, 0 ) | S4 | – | a+b | – | | |
| S6( 1, 1, 1, 0 ) | S5 | – | a+b+c | – | | |
| S7( 1, 1, 1, 1 ) | S6 | S7 | a+2b+c | 2a+2b+c | | |
| RECORDED SEQUENCE $C_k$ | 0 | 1 | 0 | 1 | | |

RECORDED SEQUENCE/ ESTIMATED VALUE OF DECODER

WAVEFORM EQUALIZATION CONTROL DEVICE

RELATED APPLICATIONS

This application is the U.S. National Phase under 35 U.S.C. §371 of International Application No. PCT/JP2006/314406, filed on Jul. 20, 2006, which in turn claims the benefit of Japanese Application No. 2005-209749, filed on Jul. 20, 2005, the disclosures of which Applications are incorporated by reference herein.

TECHNICAL FIELD

The present invention relates to a waveform equalization control device and, more particularly, to a waveform equalization control device for reducing intersymbol interference in signals.

BACKGROUND ART

In recent years, optical disc media such as a CD (Compact Disc) and a DVD (Digital Versatile Disc) have diversified into various types, and means for recording information in these media has also diversified. In particular, because the recording density of a DVD is higher than that of a CD, a waveform reproduced from the DVD disc is distorted under the influence of intersymbol interference.

For example, 8/16 modulation is used for the DVD so that a pit length is regulated to be any of a plurality of predetermined lengths. However, the length of a pit is not necessarily precise. When the waveform of a read signal is distorted by intersymbol interference, misreading of data is likely to occur so that the reliability of data is significantly degraded. Therefore, a wavelength equalization technology which improves the performance of such a high-density optical disc against intersymbol interference has become indispensable.

As an example of the waveform equalization technology, there is a partial response (PR) technique which performs waveform equalization after giving known intersymbol interference. In relation to a waveform equalization learning control technology for the DVD, there has been known a DVD reproduction method using a PRML (Partial Response Maximum Likelihood) method which uses a (2, 10) RLL (Run Length Limited) code in 8/16 modulation and has an asymmetric waveform equalizing function (see, e.g., Patent Document 1).

Patent Document 1: Japanese Laid-Open Patent Publication No. 2003-85764

DISCLOSURE OF THE INVENTION

Problem to be Solved by the Invention

However, a process according to a low-order PR method amplifies high-frequency noise among the frequency components of a reproduced signal and utilizes harmonic distortion. As a result, the quality of the signal may deteriorate under the influence of jitter and, as the speed of reading from a recording medium is higher, it is more difficult to lower an error rate.

It is therefore an object of the present invention to reduce the error rate in the case of performing high-speed reading from an optical recording medium.

Means for Solving the Problems

A waveform equalization control device according to the present invention includes: a waveform equalizer that has a filter provided with a plurality of taps, updates a tap coefficient of each of the plurality of taps in accordance with a tap coefficient signal inputted thereto, causes the plurality of taps to respectively receive a plurality of values sampled at different time points from an input signal, performs waveform equalization with respect to the input signal, and outputs the signal after the waveform equalization; a first equalization target value generation unit for determining a first equalization target value based on the signal after the waveform equalization outputted from the waveform equalizer and outputting the first equalization target value; an error estimation unit for obtaining an error between the first equalization target value and the signal after the waveform equalization and outputting the error as an error signal; and a coefficient update unit for calculating an amount of updating the coefficient of each of the taps of the filter of the waveform equalizer based on the error signal and on the input value to each of the taps and outputting the amount of updating the coefficient as the tap coefficient signal, wherein the first equalization target value generation unit obtains sign signals each showing whether the signal after the waveform equalization has a positive value or a negative value for first, second, third, fourth, and fifth time points which are successively different by intervals at which the input signal is sampled, calculates a first total sum which is a sum of respective results of multiplying the sign signals for the first to fifth time points by $\theta$, $\beta$, $\alpha$, $\beta$, and $\theta$ (where each of $\alpha$, $\beta$, and $\theta$ is a predetermined real number), and determines a value corresponding to the first total sum as the first equalization target value.

This allows waveform equalization according to a PR (a, b, c, b, a) method to be performed. As a result, it is possible to widen an eye pattern in the processing of a reproduced signal from an optical recording medium and suppress a jitter component. Accordingly, an error rate during reproduction can be reduced.

EFFECT OF THE INVENTION

The present invention allows a reduction in error rate when reading from an optical recording medium is performed. As a result, it becomes possible to perform the reading at a higher speed.

BRIEF DESCRIPTION OF THE DRAWINGS

FIG. 2(a) is a view illustrating an offset sampling method and FIG. 2(b) is a view illustrating a peak sampling method;

FIG. 3(a) is a view illustrating a bit sequence satisfying a requirement on a (2, 10) RLL code and FIG. 3(b) is a view illustrating a state transition diagram with a PR (a, b, c, b, a) ML technology when the (2, 10) RLL code is used for 8/16 modulation and a minimum code reversal length is assumed to be 3;

Figure 1:
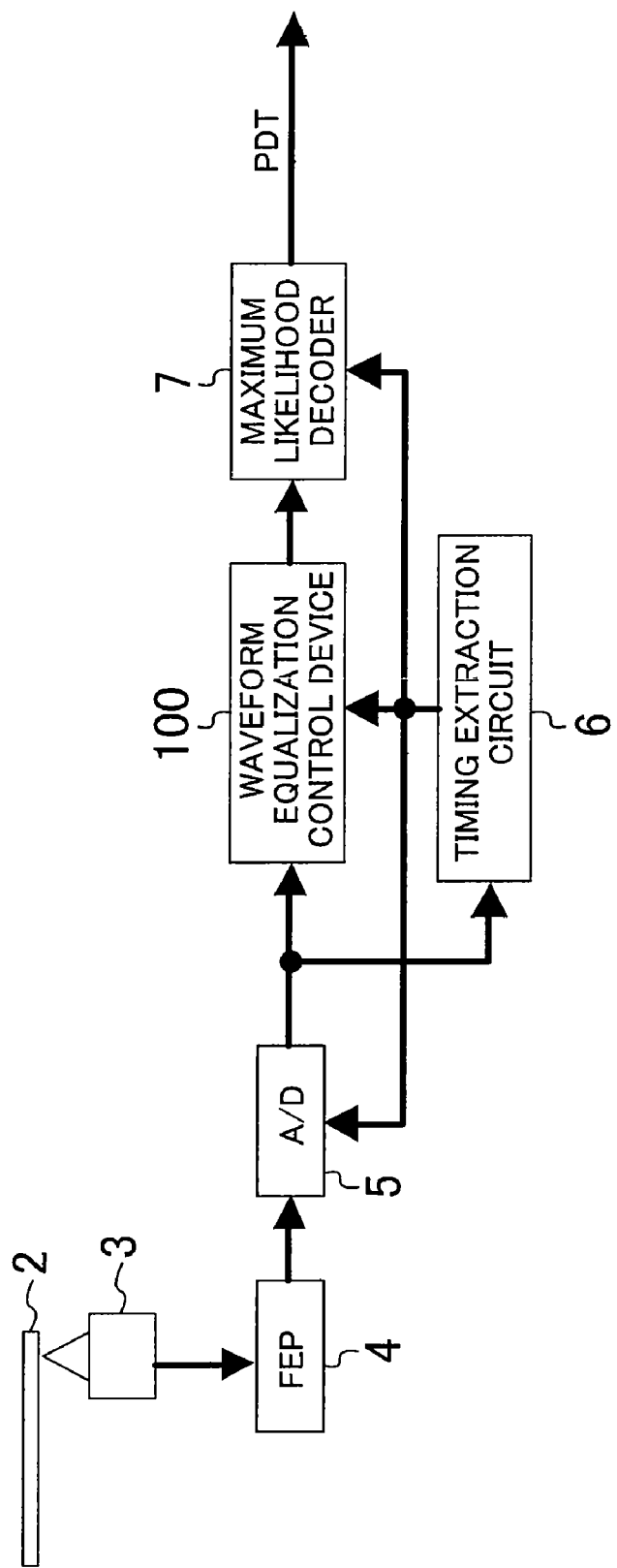
FIG. 1 is a block diagram showing s structure of an information reproduction apparatus having a waveform equalization control device according to a first embodiment of the present invention.

DESCRIPTION OF NUMERALS 12, 212 Waveform Equalizer
14, 214 Error Estimation Unit
16, 216 Coefficient Update Unit
20, 220 PR (a, b, c, b, a) Waveform Equalization Target Value Generation Unit (First Waveform Equalization Target Value Generation Unit)
29 Memory (First Storage Unit)
218 PR Equalization Method Selection Unit
230 PR (a, b, b, a) Waveform Equalization Target Value Generation Unit (Second Waveform Equalization Target Value Generation Unit
239 Memory (Second Storage Unit)

BEST MODE FOR CARRYING OUT THE INVENTION

Referring to the drawings, each of the embodiments of the present invention will be described hereinbelow in detail.

Embodiment 1

FIG. 1 is a block diagram showing a structure of an information reproduction apparatus having a waveform equalization control device according to the first embodiment of the present invention. The information reproduction apparatus of FIG. 1 includes an optical pick-up 3, a front end processor (FEP) 4, an analog/digital (A/D) converter 5, a timing extraction circuit 6, a maximum likelihood decoder 7, and a waveform equalization control device 100.

The optical pick-up 3 irradiates the optical disc 2 with a laser beam, detects the intensity of the light reflected from the optical disc 2, and converts information recorded on the optical disc 2 to an electric signal (reproduced signal). The FEP 4 amplifies the reproduced signal that has been read and performs the processes of removing an unneeded high-frequency noise component and boosting a needed signal band. The A/D converter 5 converts the signal processed by the FEP 4 to a digital signal and outputs the digital signal to the timing extraction circuit 6 and to the waveform equalization control device 100.

The timing extraction circuit 6 selects a proper sampling method and generates a timing signal (channel clock) synchronous with the signal after A/D conversion. The sampling method is subdivided into two types, which are an offset sampling method and a peak sampling method. The timing extraction circuit 6 outputs the generated timing signal to each of the A/D converter 5, the waveform equalization control device 100, and the maximum likelihood decoder 7.

FIG. 2(a) is a view illustrating the offset sampling method and FIG. 2(b) is a view illustrating the peak sampling method. As shown in FIG. 2(a), the offset sampling method is a sampling method synchronous with the edges of pits (marks) each associated with "1" as recorded information and used in the case of performing waveform equalization in accordance with a PR (a, b, b, a) method.

As shown in FIG. 2(b), the peak sampling method is a sampling method which samples the peak value of a reproduced signal waveform obtained from a pattern of pits recorded on the disc which have the length corresponding to an odd multiple of the period T (e.g., 3T, 5T, or the like) of a timing signal. The method is used in the case of performing waveform equalization in accordance with a PR (a, b, c, b, a) method or in the case of performing a process (level slice method) which slices a reproduced signal at an ideal center level and binarizes the sliced reproduced signal. In the peak sampling method, a sampling timing is different by half the period of the timing signal from that in the offset sampling method (the phase difference is 180°).

The waveform equalization control device 100 performs waveform equalization in accordance with PR characteristics with respect to the signal after A/D conversion and outputs the result thereof to the maximum likelihood decoder 7. The PR characteristics have been set in advance. The maximum likelihood decoder 7 decodes the waveform-equalized signal and outputs reproduced data PDT. When the waveform equalization control device 100 implements the PR characteristics, a combination of the waveform equalization control device 100 and the maximum likelihood decoder 7 is termed also as a PRML detector.

Figure 4:
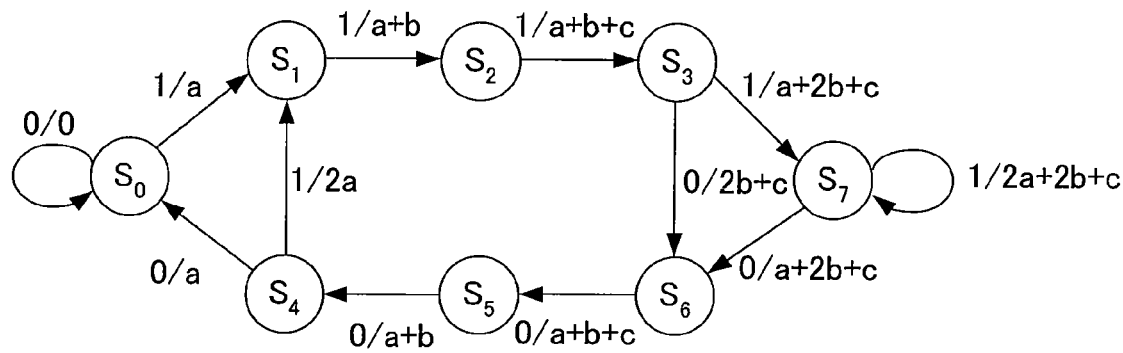
FIG. 4 is a state transition diagram with the PR (a, b, c, b, a) ML technology.
Figure 5:
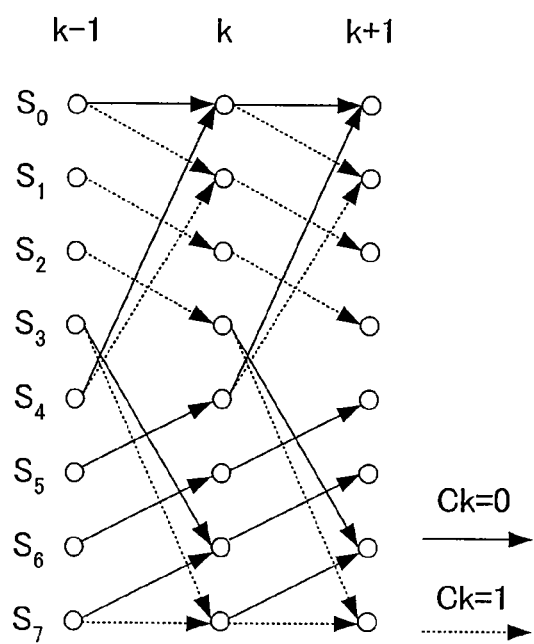
FIG. 5 is a Trellis diagram drawn based on FIG. 4.

A PRML technology will be described with reference to the drawings. FIG. 3(a) is a view illustrating a bit sequence satisfying a requirement on a (2, 10) RLL code. FIG. 3(b) is a view illustrating a state transition table with a PR (a, b, c, b, a) ML technology when the (2, 10) RLL code is used for 8/16 modulation and a minimum code reversal length is assumed to be 3. FIG. 4 is a state transition diagram with the PR (a, b, c, b, a) ML technology. FIG. 5 is a Trellis diagram drawn based on FIG. 4.

A ML (Maximum Likelihood) technology is a maximum likelihood decoding technology which uses the correlations among signal sequences resulting from intersymbol interference to decode a most likely sequence. For the ML technology, a Viterbi decoding theory is used. An input signal sequence $Y_k$ to a Viterbi decoder can be represented by the following expression (1) using the estimated value $X_k$ of the decoder and a noise sequence $N_k$:

$$Y_k = X_k + N_k \quad (1).$$

Here, the estimated value $X_k$ of the decoder can be narrowed down to eight values of 0, 2b+c, a, a+b, a+b+c, a+2b+c, 2a, and 2a+2b+c, as shown in FIG. 3(b), based on the fact that the minimum code reversal length of a DVD reproduced waveform is 3. For example, a PR (1, 2, 4, 2, 1) method is adopted when a=1, b=2, and c=4 are specified and an equalization target value is set to any of these eight values, i.e., 0, 1, 2, 3, 7, 8, 9, and 10.

The estimated value $X_k$ of the decoder can be represented by the following expression (2) on the assumption that the estimated values $X_k$ are independent of each other:

$$X_k = C_k + 2C_{k-1} + 4C_{k-2} + 2C_{k-3} + C_{k-4} \quad (2)$$

where $C_k$ is a recorded sequence.

Figure 6:
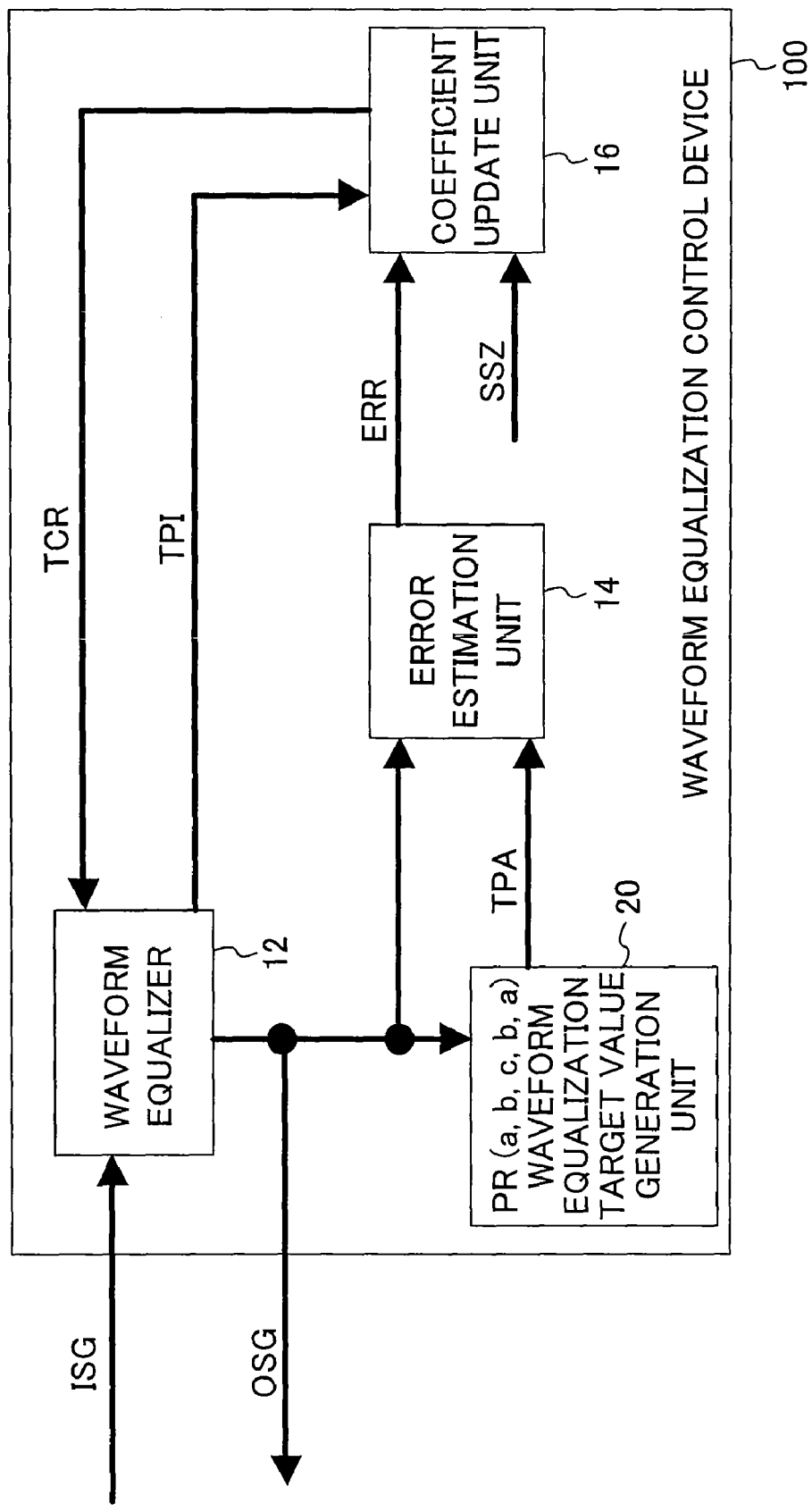
FIG. 6 is a block diagram showing a structure of the waveform equalization control device according to the first embodiment of the present invention.

FIG. 6 is a block diagram showing a structure of the waveform equalization control device 100 according to the first embodiment of the present invention. The waveform equalization control device 100 of FIG. 6 includes a waveform equalizer 12, an error estimation unit 14, a coefficient update unit 16, and a PR (a, b, c, b, a) waveform equalization target value generation unit 20. The timing extraction circuit 6 generates the timing signal in accordance with the peak sampling method.

The waveform equalizer 12 waveform-equalizes a signal ISG after A/D conversion sampled by the peak sampling method and outputs an obtained signal OSG after waveform equalization to the error estimation unit 14 and to the waveform equalization target value generation unit 20. More specifically, the waveform equalizer 12 has a transversal filter provided with a plurality of taps, causes the plurality of taps of the filter to respectively receive a plurality of values sampled at different time points from the signal ISG after A/D conversion, and performs waveform equalization with respect to the signal ISG. The waveform equalizer 12 also outputs the respective input signals to the individual taps as a tap input signal TPI to the coefficient update unit 16. The waveform equalization target value generation unit 20 determines an equalization target value TPA based on the signal OSG after waveform equalization in accordance with the PR (a, b, c, b, a) method and outputs the equalization target value TPA to the error estimation unit 14.

The error estimation unit 14 obtains the error between the signal OSG after waveform equalization and the equalization target value TPA and outputs the obtained error as an error signal ERR to the coefficient update unit 16. The error estimation unit 14 calculates the error signal ERR based on the following expression:

$$E_{(n)} = d_{(n)} - y_{(n)} \quad (3)$$

where $E_{(n)}$ represents the error signal ERR, $y_{(n)}$ represents the signal OSG after waveform equalization outputted from the waveform equalizer 12, $d_{(n)}$ represents the equalization target value TPA, which is a most likely value (i.e., closest to $y_{(n)}$) among a plurality of the equalization target values.

The coefficient update unit 16 calculates a coefficient update amount for each of the taps of the filter using a LMS (Least Mean Square) algorithm based on the tap input signal TPI, the error signal ERR, and a given step size SSZ, and outputs the coefficient update amount as a tap coefficient signal TCR to the waveform equalizer 12. The waveform equalizer 12 updates the respective tap coefficients of the plurality of taps in the transversal filter in accordance with the tap coefficient signal TCR inputted thereto.

The LMS algorithm is an algorithm for performing the n-th update of the tap coefficient $W_i$ of the tap i in the transversal filter of the waveform equalizer 12 based on the following expression (4):

$$W_{i(n+1)} = W_{i(n)} + 2\mu E_{(n)} \phi_{i(n)} \quad (4)$$

where $\mu$ represents the step size SSZ for controlling convergence, $E_{(n)}$ represents the error signal ERR, and $\phi_{i(n)}$ represents the input signal TPI to each of the taps in the n-th update.

Figure 7:
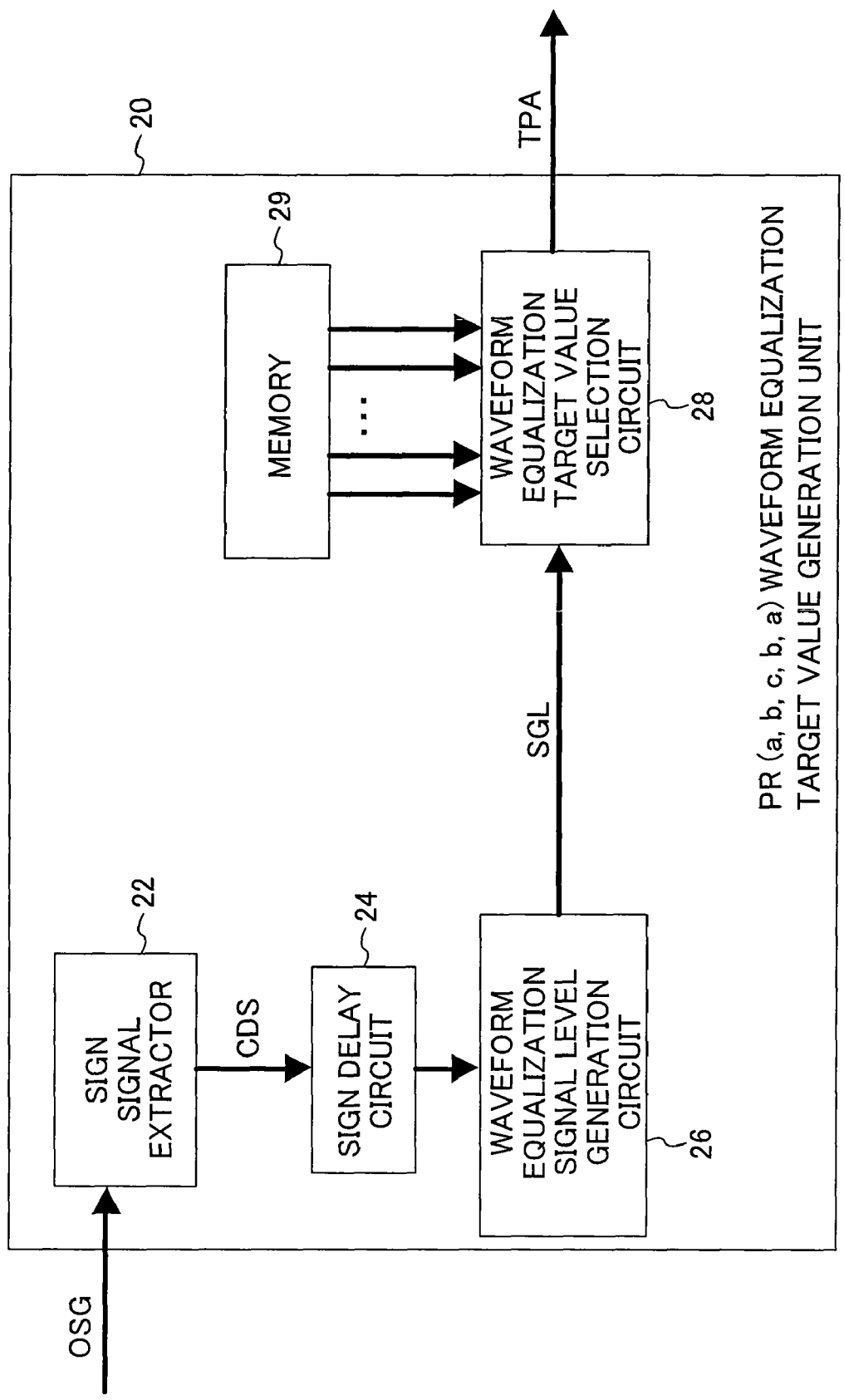
FIG. 7 is a block diagram showing a structure of the PR (a, b, c, b, a) waveform equalization target value generation unit of FIG. 6.

FIG. 7 is a block diagram showing a structure of the PR (a, b, c, b, a) waveform equalization target value generation unit 20 of FIG. 6. A detailed description will be given hereinbelow to the waveform equalization target value generation unit 20. The waveform equalization target value generation unit 20 of FIG. 7 has a sign signal extractor 22, a sign delay circuit 24, a waveform equalization signal level generation circuit 26, a waveform equalization target value selection circuit 28, and a memory (first storage unit) 29. The sign signal extractor 22 extracts a sign indicating whether the signal OSG after waveform equalization has a positive value or a negative value and outputs the sign as a sign signal CDS to the sign delay circuit. For example, the sign signal extractor 22 outputs "1" when the inputted value is positive and outputs "0" when the inputted value is negative.

Figure 8:
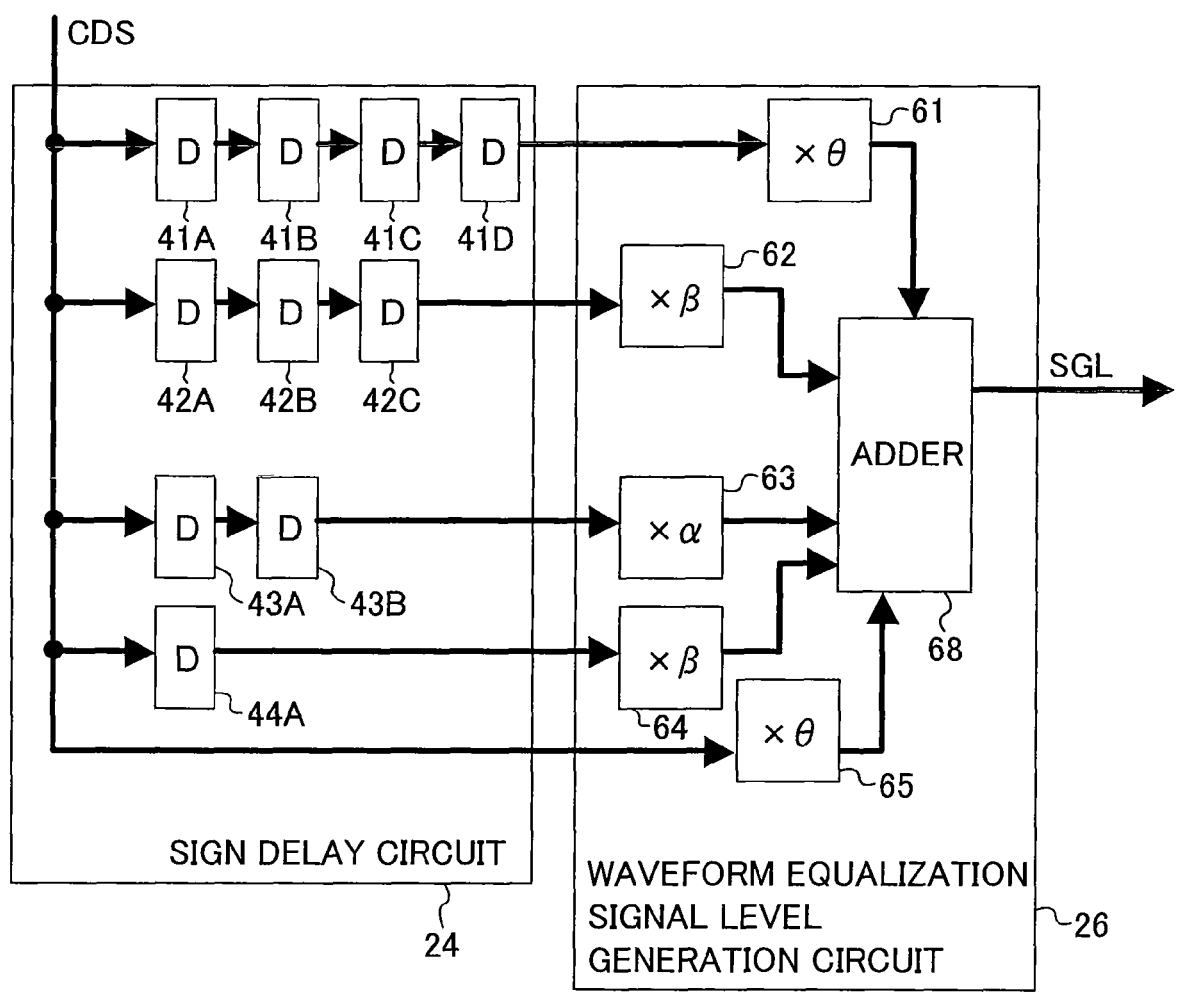
FIG. 8 is a block diagram showing an example of respective structures of the sign delay circuit and waveform equalization signal level generation circuit of FIG. 7.

FIG. 8 is a block diagram showing an example of respective structures of the sign delay circuit 24 and waveform equalization signal level generation circuit 26 of FIG. 7. In FIG. 8, the sign delay circuit 24 has delay elements 41A, 41B, 41C, 41D, 42A, 42B, 42C, 43A, 43B, and 44A. These delay elements operate in synchronization with the timing signal. The waveform equalization signal level generation circuit 26 has multipliers 61, 62, 63, 64, and 65 and an adder 68.

The delay elements 41A to 41D give a delay 4T to the sign signal CDS and output the sign signal CDS with the delay 4T to the multiplier 61. The delay elements 42A to 42C give a delay 3T to the sign signal CDS and output the sign signal CDS with the delay 3T to the multiplier 62. The delay elements 43A and 43B give a delay 2T to the sign signal CDS and output the sign signal CDS with the delay 2T to the multiplier 63. The delay element 44A gives the delay T to the sign signal CDS and outputs the sign signal CDS with the delay T to the multiplier 64. On the other hand, the waveform equalization signal level generation circuit 26 gives the sign signal CDS as it is to the multiplier 65.

The multipliers 61 and 65 multiply the respective values inputted thereto each by a constant $\theta$ and output the obtained values to the adder 68. The multipliers 62 and 64 multiply the respective values inputted thereto each by a constant $\beta$ and output the obtained values to the adder 68. The multiplier 63 multiplies the value inputted thereto by a constant $\alpha$ and outputs the obtained value to the adder 68. The adder 68 calculates the total sum of the values outputted from the multipliers 61 to 65 and outputs the total sum as a signal level SGL to the waveform equalization target value selection circuit 28. The values of the constants $\alpha$, $\beta$, and $\theta$ are determined in accordance with the PR (a, b, c, b, a) method in use, i.e., in accordance with the values of the coefficients a, b, and c. For example, when a=1, b=2, and c=4 are satisfied, $\alpha$=4, $\beta$=2, and $\theta$=1 are satisfied.

Figure 9:
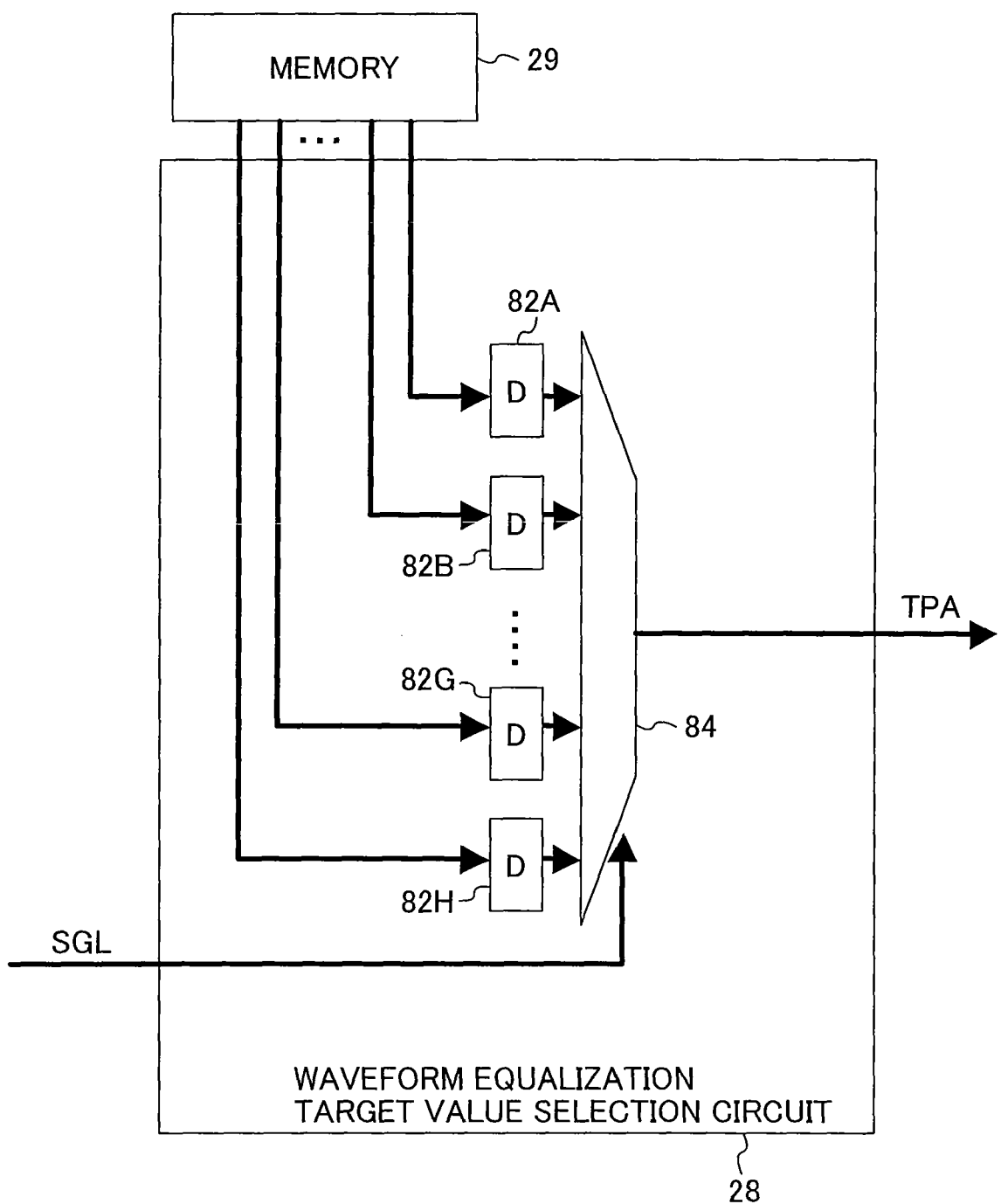
FIG. 9 is a block diagram showing an example of a structure of the waveform equalization target value selection circuit of FIG. 7.

FIG. 9 is a block diagram showing an example of a structure of the waveform equalization target value selection circuit 28 of FIG. 7. In FIG. 9, the waveform equalization target value selection circuit 28 has holding elements 82A, 82B, . . . , 82G, and 82H and a selector 84. In the memory 29, a plurality of equalization target values corresponding to respective values that can be taken by the signal level SGL are stored. The memory 29 causes the holding elements 82A to 82H to respectively store these equalization target values. The selector 84 selects the one of the holding elements 82A to 82H which stores the equalization target value corresponding to the value of the signal level SGL and outputs the value stored therein as the equalization target value TPA.

In this manner, the waveform equalization target value generation unit 20 can determine a proper equalization target value based on the signal OSG after waveform equalization. Instead of the memory 29, a holding element such as a register may also be used. It is also possible to write a proper value according to the equalization method in the memory 29 from the outside.

Figure 10:
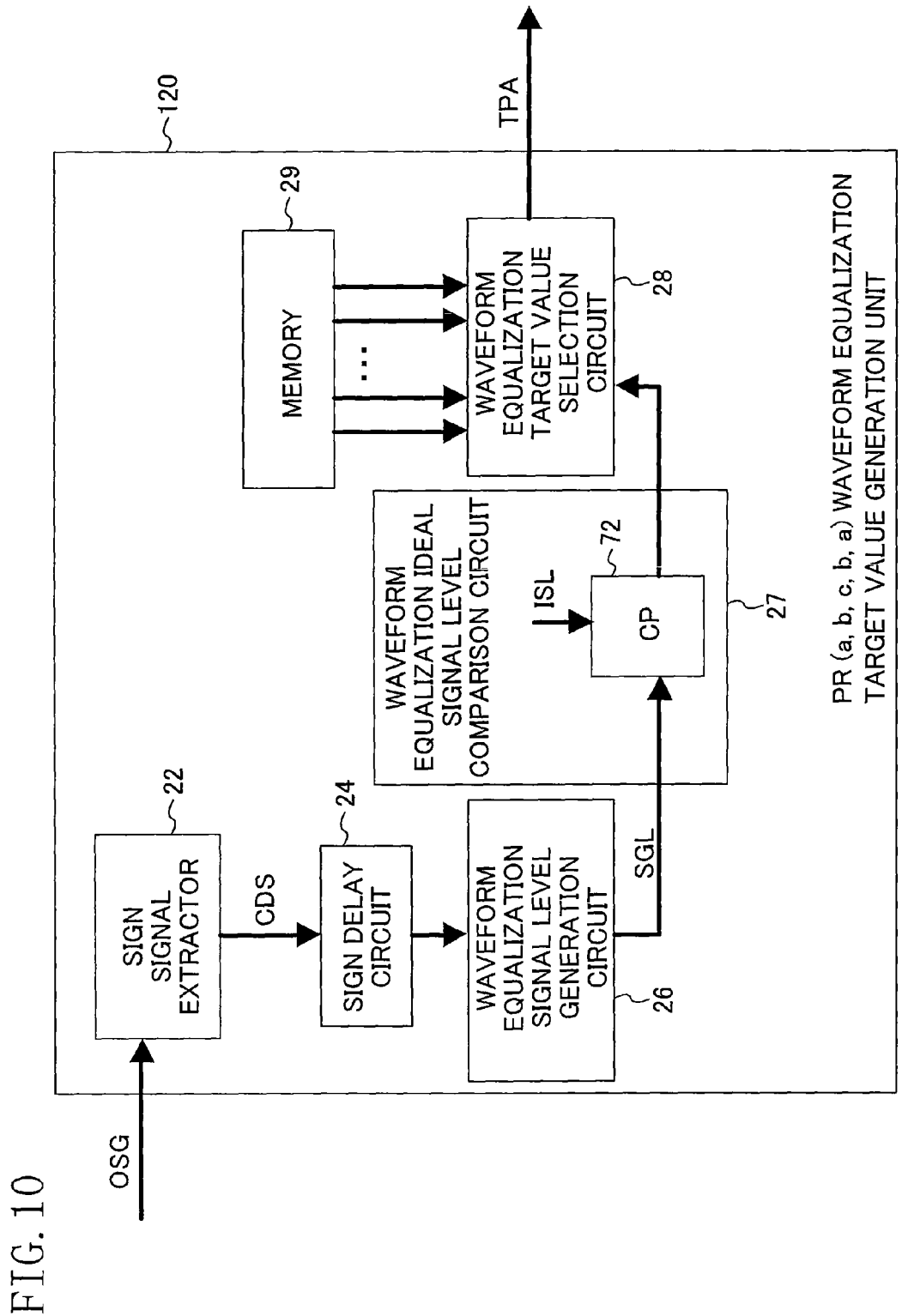
FIG. 10 is a block diagram showing a structure of a variation of the PR (a, b, c, b, a) waveform equalization target value generation unit.

FIG. 10 is a block diagram showing a structure of a variation of the PR (a, b, c, b, a) waveform equalization target value generation unit 20. The waveform equalization target value generation unit 120 of FIG. 10 further includes a waveform equalization ideal signal level comparison circuit 27 in addition to the components of the waveform equalization target value generation unit 20 of FIG. 7. The waveform equalization ideal signal level comparison circuit 27 has a comparator 72 to which an ideal equalization signal level ISL has been inputted. The ideal equalization signal level ISL shows a plurality of values that can be taken by the signal level SGL and these values are determined in accordance with the PR (a, b, c, b, a) method.

The comparator 72 compares the signal level SGL with the ideal equalization signal level ISL. When the signal level SGL does not have a value shown as the ideal equalization signal level ISL, the comparator 72 does not output the signal level SGL to the waveform equalization target value selection circuit 28. In this case, the waveform equalization target value selection circuit 28 keeps the equalization target value TPA from being outputted. When the signal level SGL has the value shown as the ideal equalization signal level ISL, the comparator 72 outputs the signal level SGL as it is to the waveform equalization target value selection circuit 28.

With the waveform equalization target value generation unit 120, when the signal level SGL cannot be obtained correctly, it is possible to keep an improper equalization target value TPA from being outputted.

Thus, with the waveform equalization control device 100 of FIG. 6, it is possible to determine the waveform equalization target value in accordance with the PR (a, b, c, b, a) method and optimize the tap coefficients of the filter provided in the waveform equalizer 12.

Embodiment 2

Figure 11:
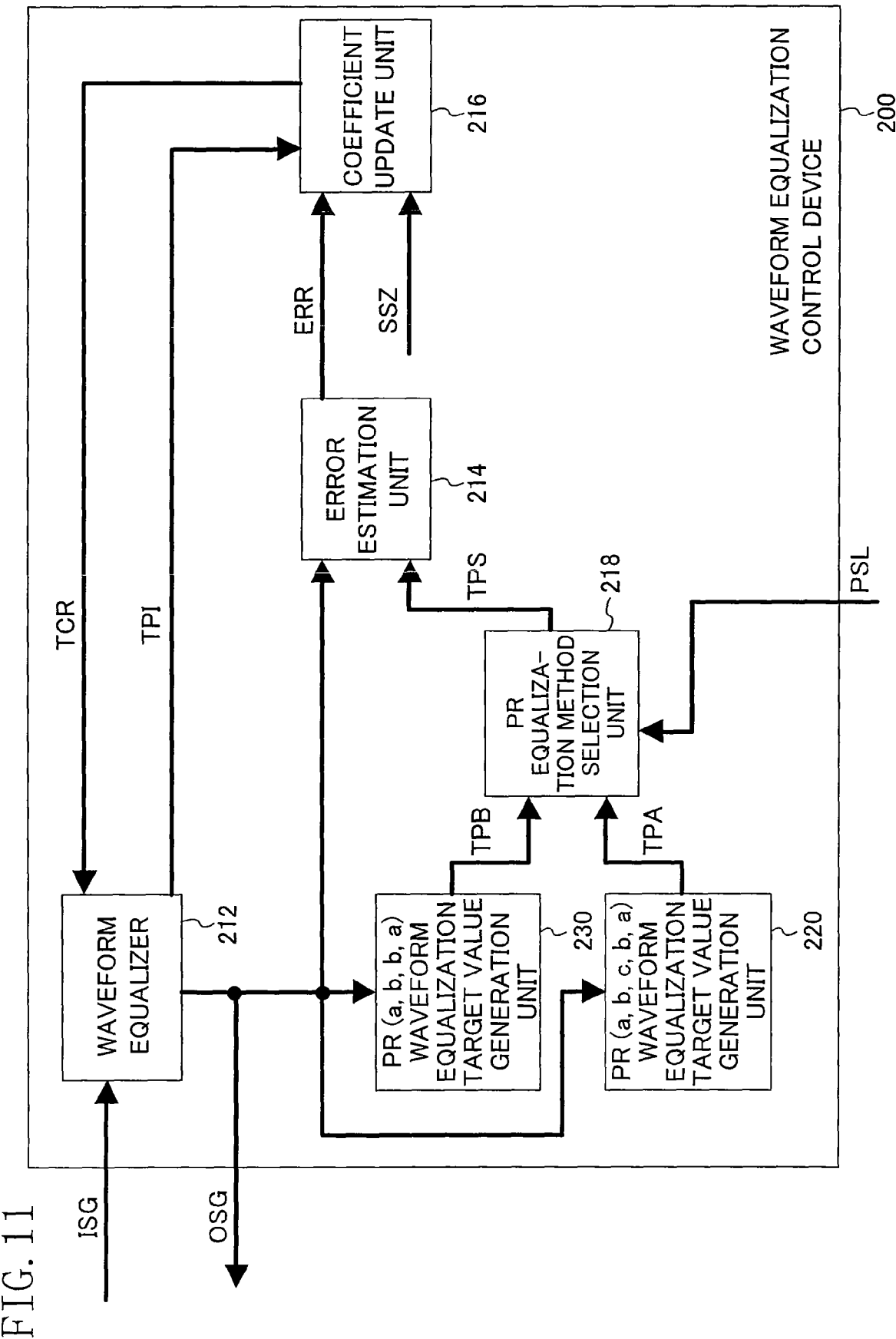
FIG. 11 is a block diagram showing a structure of a waveform equalization control device according to a second embodiment of the present invention.

FIG. 11 is a block diagram showing a structure of a waveform equalization control device 200 according to a second embodiment of the present invention. The waveform equalization control device 200 of FIG. 11 is used as a replacement for the waveform equalization control device 100 in the information reproduction apparatus of FIG. 1. The waveform equalization control device 200 of FIG. 11 includes a waveform equalizer 212, an error estimation unit 214, a coefficient update unit 216, a PR equalization method selection unit 218, a PR (a, b, c, b, a) waveform equalization target value generation unit 220, and a PR(a, b, b, a) waveform equalization target value generation unit 230.

The waveform equalizer 212, the error estimation unit 214, the coefficient update unit 216, and the PR (a, b, c, b, a) waveform equalization target value generation unit 220 are substantially the same as the waveform equalizer 12, the error estimation unit 14, the coefficient update unit 16, and the PR (a, b, c, b, a) waveform equalization target value generation unit 20 of FIG. 6, so that a detailed description thereof will be omitted.

The PR(a, b, b, a) waveform equalization target value generation unit 230 determines an equalization target value TPB based on the signal OSG after waveform equalization in accordance with the PR(a, b, b, a) method and outputs the equalization target value TPB to the PR equalization method selection unit 218. The PR (a, b, c, b, a) waveform equalization target value generation unit 220 also outputs the obtained equalization target value TPA to the PR equalization method selection unit 218.

The PR equalization method selection unit 218 selects the equalization target value TPA or TPB in accordance with an equalization method switch signal PSL and outputs the selected equalization target value as an equalization target value TPS to the error estimation unit 214. The error estimation unit 214 is the same as the error estimation unit 14 of FIG. 6, except that the selected equalization target value TPS is used instead of the equalization target value TPA. When the equalization target value TPA is selected, the timing extraction circuit 6 of FIG. 1 generates the timing signal in accordance with the peak sampling method. When the equalization target value TPB is selected, the timing extraction circuit 6 of FIG. 1 generates the timing signal in accordance with the offset sampling method.

Figure 12:
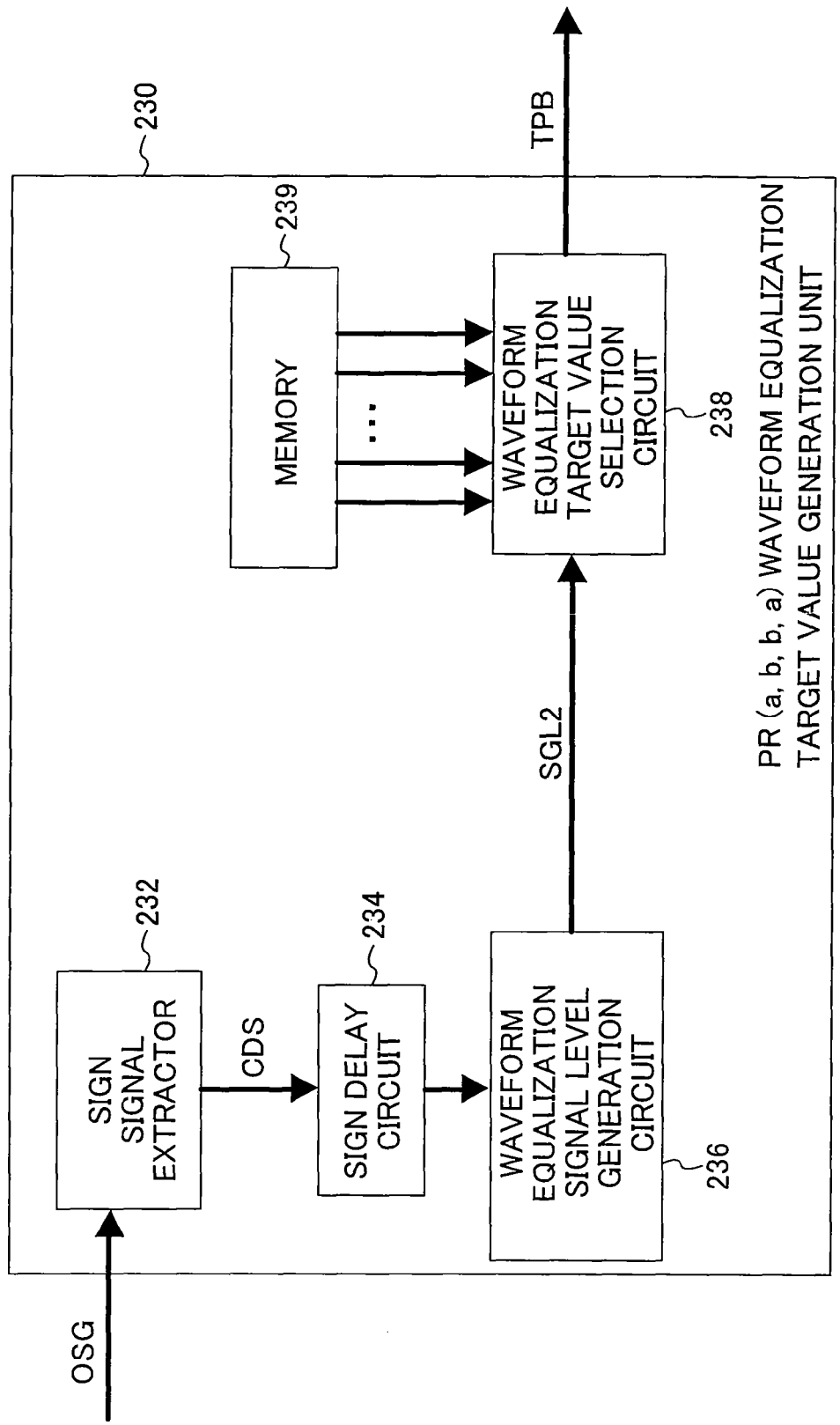
FIG. 12 is a block diagram showing a structure of the PR (a, b, b, a) waveform equalization target value generation unit of FIG. 11.

FIG. 12 is a block diagram showing a structure of the PR(a, b, b, a) waveform equalization target value generation unit 230 of FIG. 11. A detailed description will be given hereinbelow to the waveform equalization target value generation unit 230. The waveform equalization target value generation unit 230 of FIG. 12 has a sign signal extractor 232, a sign delay circuit 234, a waveform equalization signal level generation circuit 236, a waveform equalization target value selection circuit 238, and a memory (second storage unit) 239. The sign signal extractor 232 is the same as the sign signal extractor 22 of FIG. 7.

Figure 13:
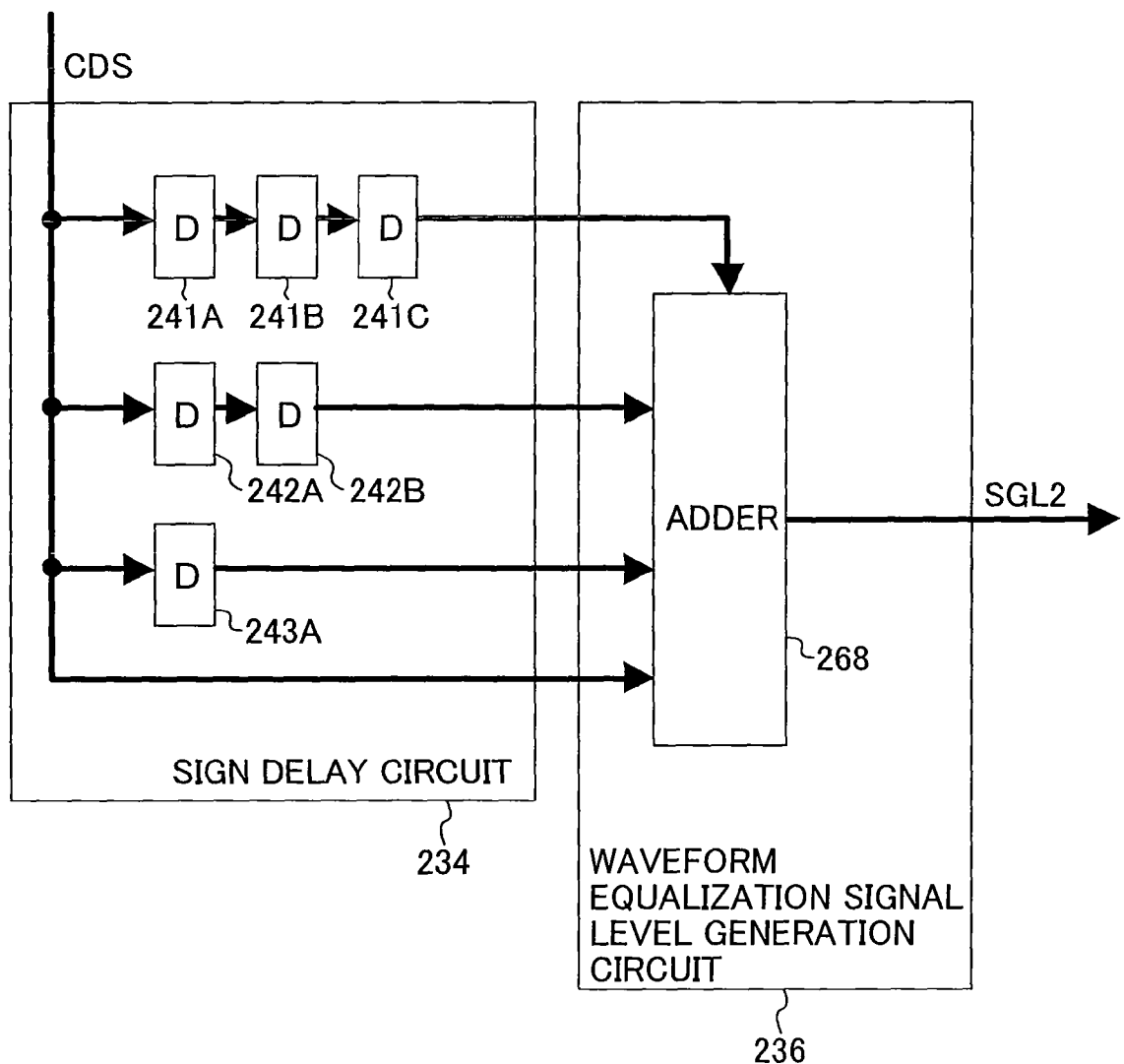
FIG. 13 is a block diagram showing an example of respective structures of the sign delay circuit and waveform equalization signal level generation circuit of FIG. 12.

FIG. 13 is a block diagram showing an example of respective structures of the sign delay circuit 234 and the waveform equalization signal level generation circuit 236 of FIG. 12. In FIG. 13, the sign delay circuit 234 has delay elements 241A, 241B, 241C, 242A, 242B, and 243A. These delay elements operate in synchronization with the timing signal. The waveform equalization signal level generation circuit 236 has an adder 68.

The delay elements 241A to 241C give the delay 3T to the sign signal CDS and output the sign signal CDS with the delay 3T to an adder 268. The delay elements 242A and 242B give the delay 2T to the sign signal CDS and output the sign signal CDS with the delay 2T to the adder 268. The delay element 43A gives the delay T to the sign signal CDS and outputs the sign signal CDS with the delay T to the adder 268. On the other hand, the waveform equalization signal level generation circuit 236 gives the sign signal CDS as it is to the adder 268. The adder 268 calculates the total sum of the values outputted from the delay elements 241C, 242B, and 243A and outputs the total sum as a signal level SGL2 to the waveform equalization target value selection circuit 238.

Figure 14:
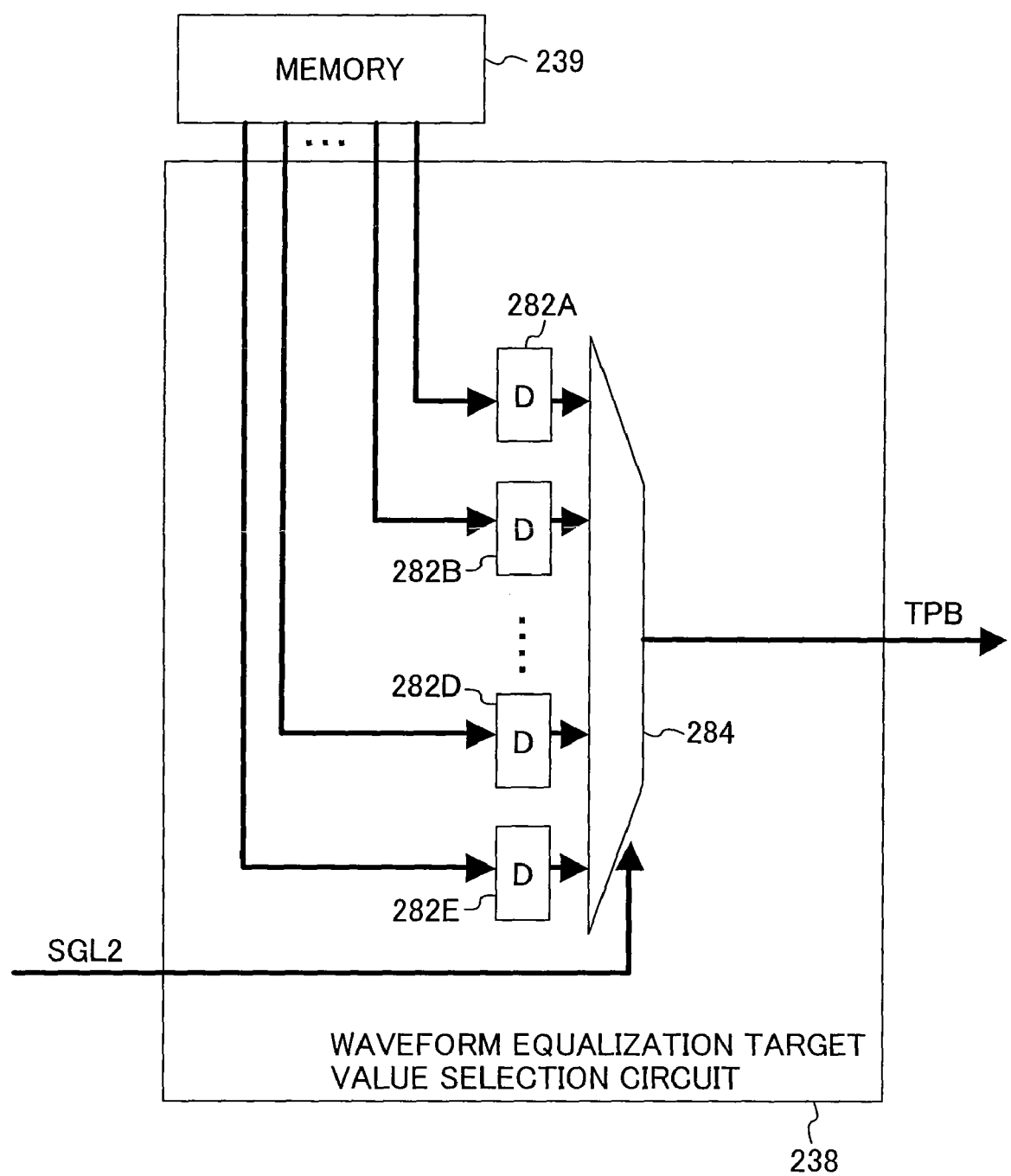
FIG. 14 is a block diagram showing an example of a structure of the waveform equalization target value selection circuit of FIG. 12.

FIG. 14 is a block diagram showing an example of a structure of the waveform equalization target value selection circuit 238 of FIG. 12. In FIG. 14, the waveform equalization target value selection circuit 238 has holding elements 282A, 282B, ..., 282D, and 282E and a selector 284. In the memory 239, a plurality of equalization target values corresponding to respective values that can be taken by the signal level SGL2 are stored. The memory 239 causes the holding elements 282A to 282E to respectively store these equalization target values. The selector 284 selects the one of the holding elements 282A to 282E which stores the equalization target value corresponding to the value of the signal level SGL2 and outputs the value stored therein as the equalization target value TPB.

In this manner, the waveform equalization target value generation unit 230 can determine a proper equalization target value based on the signal OSG after waveform equalization. Instead of the memory 239, a holding element such as a register may also be used. It is also possible to write a proper value according to the equalization method in the memory 239 from the outside.

Figure 15:
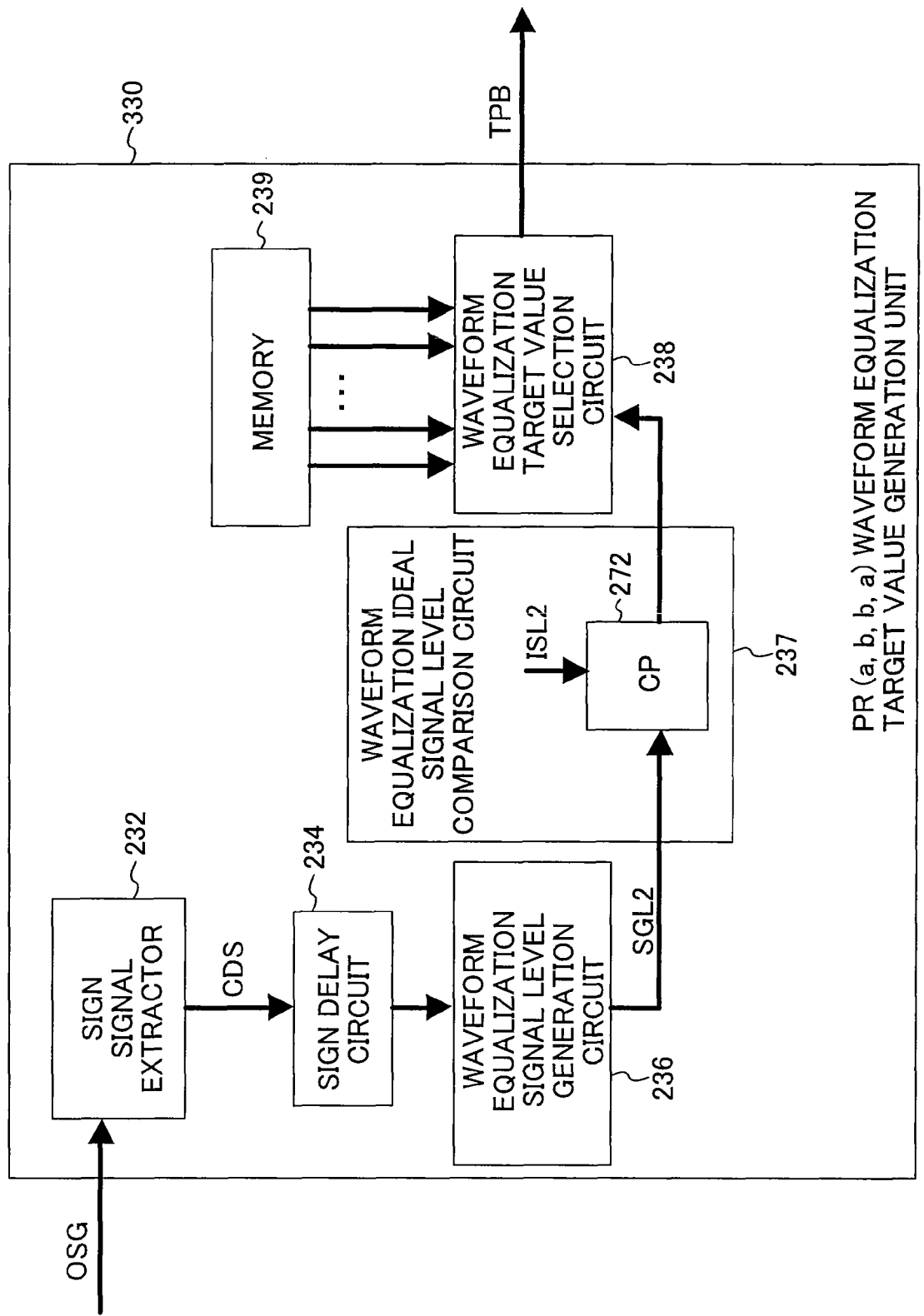
FIG. 15 is a block diagram showing a structure of a variation of the PR (a, b, b, a) waveform equalization target value generation unit.

FIG. 15 is a block diagram showing a structure of a variation of the PR (a, b, b, a) waveform equalization target value generation unit 230. The waveform equalization target value generation unit 330 of FIG. 15 further includes a waveform equalization ideal signal level comparison circuit 237 in addition to the components of the waveform equalization target value generation unit 230 of FIG. 12. The waveform equalization ideal signal level comparison circuit 237 has a comparator 272 to which an ideal equalization signal level ISL2 has been inputted. The ideal equalization signal level ISL2 shows a plurality of values that can be taken by the signal level SGL2 and these values are determined in accordance with the PR (a, b, b, a) method.

The comparator 272 compares the signal level SGL2 with the ideal equalization signal level ISL2. When the signal level SGL2 does not have a value shown as the ideal equalization signal level ISL2, the comparator 272 does not output the signal level SGL2 to the waveform equalization target value selection circuit 238. In this case, the waveform equalization target value selection circuit 238 does not output the equalization target value TPB. When the signal level SGL2 has the value shown as the ideal equalization signal level ISL2, the comparator 272 outputs the signal level SGL2 as it is to the waveform equalization target value selection circuit 238.

With the waveform equalization target value generation unit 330, when the signal level SGL2 cannot be obtained correctly, it is possible to keep an improper equalization target value TPB from being outputted.

Thus, with the waveform equalization control device 200 of FIG. 11, it is possible to select a proper one between the PR (a, b, c, b, a) method and the PR (a, b, b, a) method by giving the equalization method switch signal PSL in accordance with the type of a medium and a reproduction speed and perform waveform equalization.

INDUSTRIAL APPLICABILITY

As described above, the present invention allows waveform equalization according to the PR (a, b, c, b, a) method to be performed so that it is useful in an apparatus for performing reproduction from a DVD or another optical disc or the like.

The invention claimed is:

1. A waveform equalization control device comprising:
   a waveform equalizer that has a filter provided with a plurality of taps, updates a tap coefficient of each of the plurality of taps in accordance with a tap coefficient signal inputted thereto, causes the plurality of taps to respectively receive a plurality of values sampled at different time points from an input signal, performs waveform equalization with respect to the input signal, and outputs the signal after the waveform equalization;
   a first equalization target value generation unit for determining a first equalization target value based on the signal after the waveform equalization outputted from the waveform equalizer and outputting the first equalization target value;
   an error estimation unit for obtaining an error between the first equalization target value and the signal after the waveform equalization and outputting the error as an error signal; and
   a coefficient update unit for calculating an amount of updating the coefficient of each of the taps of the filter of the waveform equalizer based on the error signal and on the input value to each of the taps and outputting the amount of updating the coefficient as the tap coefficient signal, wherein
   the first equalization target value generation unit obtains sign signals each showing whether the signal after the waveform equalization has a positive value or a negative value for first, second, third, fourth, and fifth time points which are successively different by intervals at which the input signal is sampled, calculates a first total sum which is a sum of respective results of multiplying the sign signals for the first to fifth time points by $\theta$, $\beta$, $\alpha$, $\beta$, and $\theta$ (where each of $\alpha$, $\beta$, and $\theta$ is a predetermined real number), and determines a value corresponding to the first total sum as the first equalization target value.

2. The waveform equalization control device of claim 1, wherein the first equalization target value generation unit has a first storage unit for storing a plurality of values and selects the first equalization target value from among the plurality of values stored in the first storage unit.

3. The waveform equalization control device of claim 1, wherein the first equalization target value is a value used to perform waveform equalization in accordance with a PR (Partial Response) (1, 2, 4, 2, 1) equalization method.

4. The waveform equalization control device of claim 1, wherein the first equalization target value generation unit keeps the first equalization target value from being outputted when the first total sum is other than a plurality of predetermined values.

5. The waveform equalization control device of claim 1, further comprising:
   a second equalization target value generation unit for determining a second equalization target value based on the signal after the waveform equalization outputted from the waveform equalizer and outputting the second equalization target value; and
   an equalization method selection unit for selecting either of the first and second equalization target values and outputting the selected equalization target value, wherein
   the error estimation unit obtains an error between the equalization target value selected by the equalization method selection unit and the signal after the waveform equalization and outputs the error as the error signal and
   the second equalization target value generation unit obtains sign signals each showing whether the signal after the waveform equalization has a positive value or a negative value for sixth, seventh, eighth, and ninth time points which are successively different by intervals at which the input signal is sampled, calculates a second total sum which is a sum of the sign signals for the sixth to ninth time points, and determines a value corresponding to the second total sum as the second equalization target value.

6. The waveform equalization control device of claim 5, wherein the second equalization target value generation unit has a second storage unit for storing a plurality of values and selects the second equalization target value from among the plurality of values stored in the second storage unit.

* * * * *